United States Patent [19]

Schechter

[11] Patent Number: 4,790,277
[45] Date of Patent: Dec. 13, 1988

[54] SELF-ADJUSTING FUEL INJECTION SYSTEM

[75] Inventor: Michael M. Schechter, Southfield, Mich.

[73] Assignee: Ford Motor Company, Dearborn, Mich.

[21] Appl. No.: 57,199

[22] Filed: Jun. 3, 1987

[51] Int. Cl.$^4$ .............................................. F02D 31/00
[52] U.S. Cl. .................................. 123/357; 73/119 A
[58] Field of Search ............... 123/357, 358, 359, 506; 73/119 A

[56] References Cited

U.S. PATENT DOCUMENTS

| | | | |
|---|---|---|---|
| 3,575,145 | 4/1971 | Steiger | 123/32 |
| 3,587,547 | 6/1971 | Hussey et al. | 123/32 |
| 3,835,819 | 9/1974 | Anderson, Jr. | 123/417 |
| 4,248,194 | 2/1981 | Drutchas et al. | 123/357 |
| 4,348,895 | 9/1982 | Straubel et al. | 73/119 A |
| 4,366,541 | 12/1982 | Mouri et al. | 123/480 X |
| 4,368,705 | 1/1983 | Stevenson et al. | 123/357 |
| 4,398,515 | 8/1983 | Canup et al. | 123/357 |
| 4,402,294 | 9/1983 | McHugh et al. | 123/480 |
| 4,416,232 | 11/1983 | Shiozaki et al. | 123/357 |
| 4,459,955 | 7/1984 | Adey et al. | 73/119 A X |
| 4,475,507 | 10/1984 | Miyaki et al. | 123/357 |
| 4,487,181 | 12/1984 | Moore et al. | 123/357 |
| 4,494,507 | 1/1985 | Yasuhara | 123/357 |
| 4,495,915 | 1/1985 | Shinoda et al. | 123/357 |
| 4,539,956 | 9/1985 | Hengel et al. | 123/436 X |
| 4,566,068 | 1/1986 | Iwasaki et al. | 123/357 X |
| 4,576,129 | 3/1986 | Wallenfang et al. | 123/357 |
| 4,590,907 | 5/1986 | Tsukamoto et al. | 123/357 |
| 4,630,588 | 12/1986 | Sagawa et al. | 123/506 |

*Primary Examiner*—Tony M. Argenbright
*Assistant Examiner*—Eric R. Carlberg
*Attorney, Agent, or Firm*—Peter Abolins; Keith L. Zerschling

[57] ABSTRACT

A self-adjusting fuel injection system includes a solenoid controlled fuel injection pump. A memory stores fuel injection information relating to the particular fuel delivery characteristics of the pump. A controller coupled to the memory and pump actuates the pump to provide a desired amount of fuel by correcting for the individual characteristics of the pump.

10 Claims, 3 Drawing Sheets

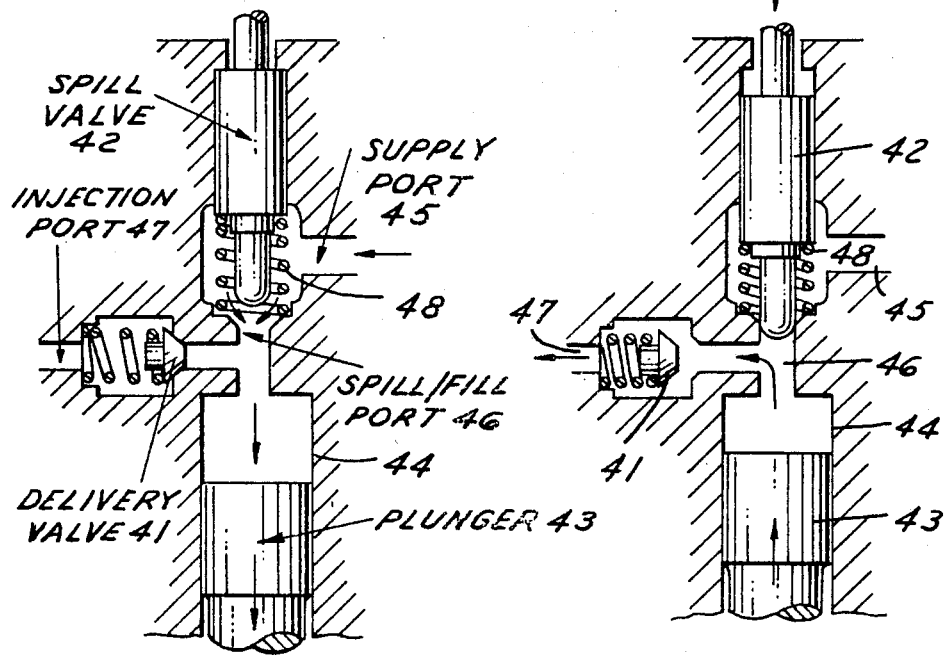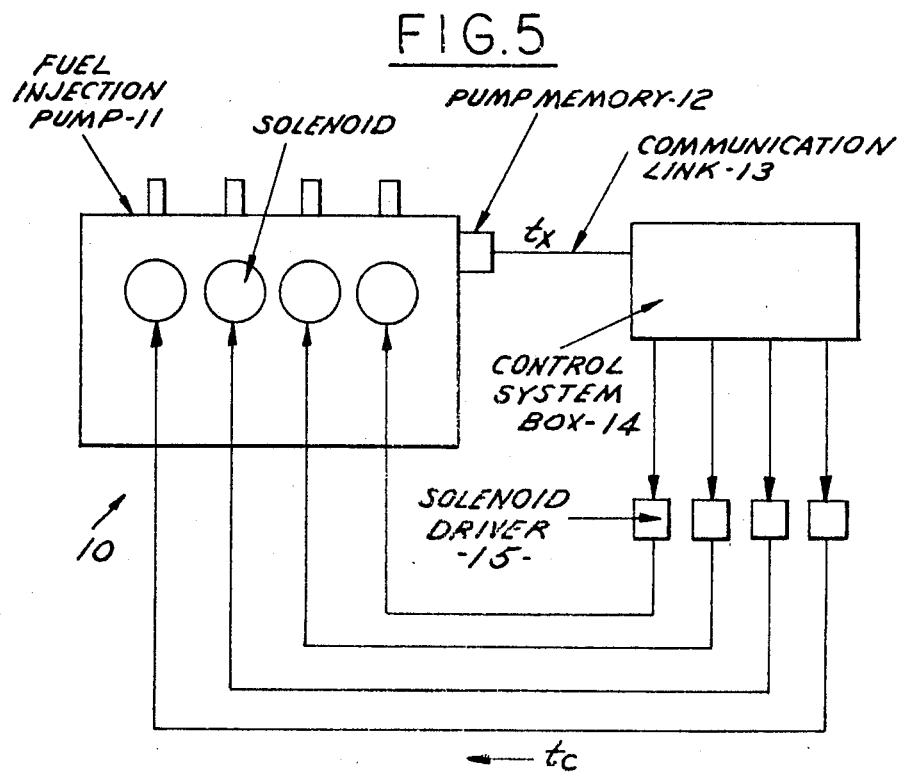

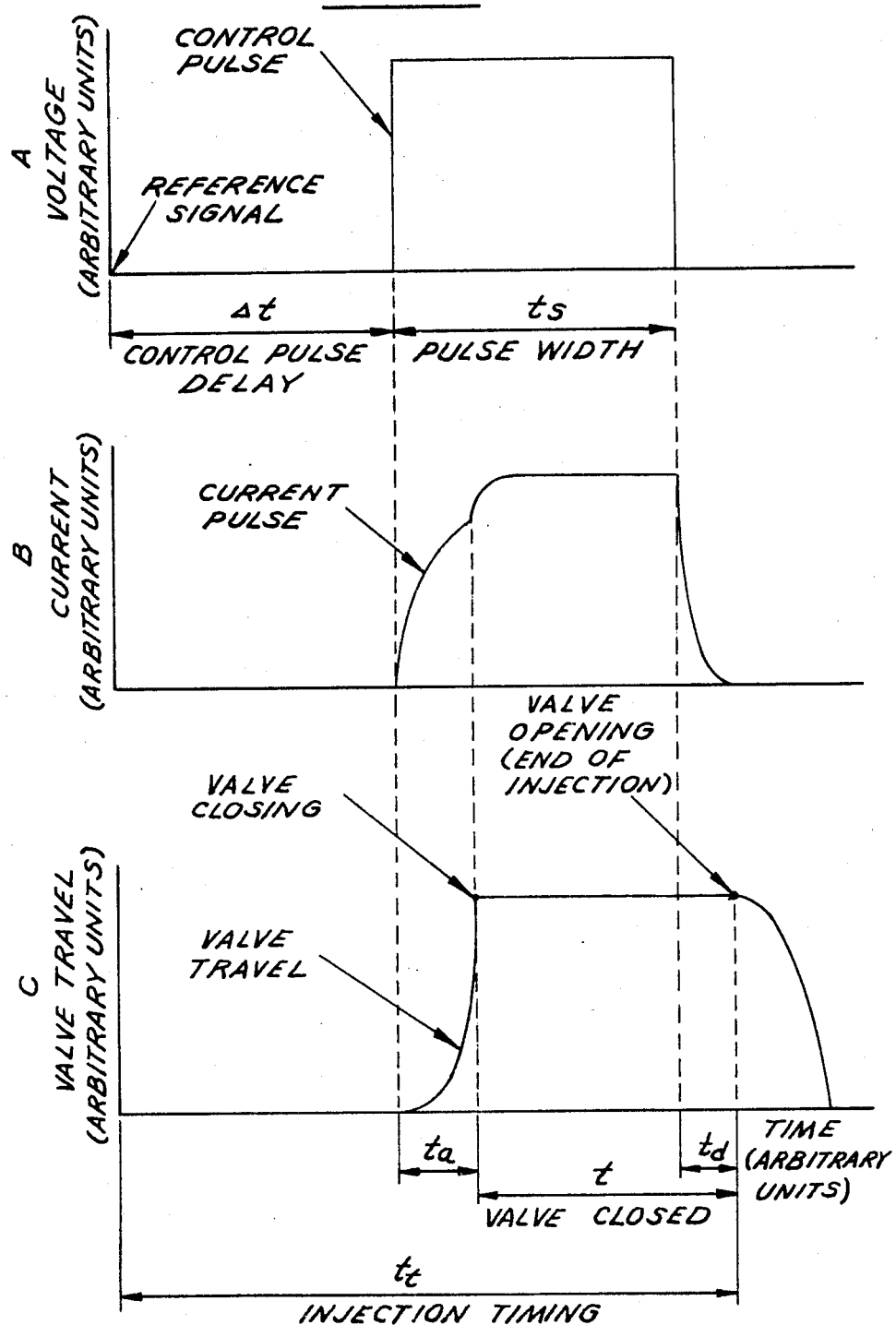

SELF-ADJUSTING FUEL INJECTION SYSTEM

BACKGROUND OF THE INVENTION

1. Field of the Invention

This invention relates to injection systems and in particular, to a fuel injection system for internal combustion engines.

2. Prior Art

Moore et al, U.S. Pat. No. 4,487,181, discloses a fuel supply system for an internal combustion engine and includes a memory associated with a fuel pump for storing fuel delivery data specific to that pump, which data has been previously ascertained during a bench test. The patent states that the memory will contain information regarding the amount of fuel pumped for different settings of the distributor member. The pump has an axially slidable rotary distributor member. Since the pump output will tend to vary with speed, the tests could be carried out at a number of different speeds. There is no specific disclosure of providing test data in the nature of pulse width correction times for a number of plungers in a spill control fuel delivery system.

Thus there is described a fuel supply system comprising a distributor type fuel injection pump, a memory containing a test record of the pump, and a control system controlling the fuel quantity and injection timing. The control system controls the fuel quantity by controlling axial position of a distributor member in the pump. It utilizes the information on the test record of the pump to assure that the desired amount of fuel is supplied to the engine. The patent does not address the issue of equal cylinder to cylinder fuel distribution. The patent states that the control system will seek to establish a particular axial position of the distributor member when a particular demand is made by an operator. In such a mode of operation, each position of the distributor member can assure only that the average fuel delivery to a multicylinder engine corresponds to the desired quantity. The quantities delivered to individual cylinders can still differ from on another.

The Moore et al patent also does not address the issue of cycle to cycle variability. For a given position of the distributor member (or another operating parameter of the pump) the fuel delivery averaged over a number of cycles can correspond to the desired quantity, while the actual delivery during a single cycle can sill vary from cycle to cycle and differ from the required value.

McHugh et al, U.S. Pat. No. 4,402,294, discloses a fuel injection system for a Plurality of electromagnetic fuel injectors having wide manufacturing tolerances, and wherein accurate fuel control is attained by adjusting the pulse width for each injector based on test data stored in a digital memory. With reference to FIGS. 1 and 2, each fuel injector 7 has associated with it a calibration resistor 12 which may represent the absolute fuel flow rate or the percent deviation of the fuel flow rate from a predetermined design valve for that particular fuel injector. In determining the proper pulse width for each fuel injector, the control system 14 samples the particular resistor and retrieves from a memory 18 the correction for that injector and then calculates the duration of the actual injection pulse.

Thus the patent describes a central fuel injection (CFI) system for an engine including a single solenoid controlled injector connected to a constant pressure common rail fuel supply system. Whenever the solenoid opens the injector outlet valve, fuel is injected through the outlet orifice. The quantity of fuel injected is determined by the product of the flow rate and the injection duration.

According to the patent, the injector is equipped with a resistor selected from a number of resistors during advance testing of the injector flow rate. The resistance of the resistor reflects the deviation of the measured flow rate from the design valve. The control system measures the resistance, interprets it in terms of percentage deviation with the aid of a table of data and makes correction in the algorithm used to compute the required pulse duration.

First, the method is applicable only to CFI or EFI systems in which the fuel flow is orifice controlled and thus the flow rate remains constant at all engine speeds. It is not usable in systems utilizing engine driven fuel injection pumps where the flow rate varies with engine speed and is affected by internal leakage which can be different for each plunger.

Second, the method does not consider the fact that the injection duration is not equal to the solenoid voltage pulse. It differs from the latter by the duration of valve opening delay and valve closure delay which may differ from injector to injector. To take this into account would require the injector to carry additional information which a single resistor cannot accommodate.

Third, since a finite number of resistors with different resistances is available, the resistance selected is, in most cases, only an approximate indication of the necessary correction. To minimize the error, very large number of resistors with resistances differing in small increments is necessary, but the error is always there. In contrast, when digital memory is used, it is always possible to enter into the memory the exact number representing the required correction.

Fourth, the table of numbers (the lookup table) contained in the memory of the system serves only for interpretation of the resistance which is measured in ohms in terms of percentage points of deviation from the design flow rate. It is the same table for all engines and is not a table of correction values providing information on individual pump characteristic.

Fifth, the issue of providing equal cylinder to cylinder fuel distribution is not addressed.

U.S. Pat. No. 4,475,507 to Miyaki et al describes a control system for controlling fuel injection quantity delivered by a single plunger distributor-type electromagnetically controlled pump. The fuel quantity is controlled by controlling the spill valve closing duration which is divided into prestroke duration $Q_R$ during which no injection takes place and injection duration $Q_e$. Sets of $Q_R$ and $Q_e$ data are prestored in the system memory, each set corresponding to a specific engine operating condition (speed, throttle position, etc.).

In a first embodiment, the system determines engine operating conditions, reads $Q_e$ and $Q_R$ corresponding to said condition, adds them and applies a pulse of $(Q_R + Q_e)$ duration to the solenoid valve. In a second embodiment, the values of $Q_R$ are modifiable during engine operation. The system maintains the idle speed of the engine within prescribed limits by making incremental changes in the $Q_R$ value in a feedback fashion whenever the idle speed deviates from the required value. A third embodiment differs from the first and the second embodiments in that there are separate $Q_R$ values for each engine cylinder, and each is feedback controlled during engine operation as a function of engine speed or other parameters. A fourth embodiment deals with setting a maximum limit for the value $(Q_R+Q_e)=-Q_{max}$.

As a result, in the Miyaki patent, the values $Q_R$ and $Q_e$ stored in the memory represent engine fuel requirements at various operating conditions. They are the same for all engines of a certain class and they do not reflect the individual pump characteristic. In other words, this is not a pump memory of the pump individual characteristic, but the engine memory of its fuel requirements. To the extent that the values $Q_R$ are modifiable, they are modified during engine operation in a feedback fashion. In column 9, lines 6–21, there is a discussion of correcting four values $Q_{R(i)}$, one for each engine cylinder, one after another so as to achieve uniform fuel delivery to all cylinders even if there is a variation in nozzles characteristics. It is not clear what would assure uniform fuel delivery. The subsequent lines 22–38 appear to confirm the impression that what is described is a feedback system in which the values $Q_R$ are corrected during engine operation.

U.S. Pat. No. 4,494,507 to Yasuhara describes a control system to control the rate of fuel injection in a feedback manner on the basis of a feedback signal provided by a sensor which measures the lift (displacement) of a valve through which the fuel is pumped.

U.S. Pat. No. 4,495,915 to Shinoda et al describes a solenoid controlled electromagnetic fuel injection pump and a control system. The control system determines the required fuel delivery and timing as a function of throttle position, engine speed, etc. and computes the required duration of injection. The injection begins some time after solenoid activation. The patent teaches a pressure sensor which senses the pressure in the plunger chamber in the Pump and signals to the control system the timing of the beginning of injection. The control system starts counting the time from this moment. There is nothing in the patent that would assure that the actual fuel delivery will equal the required amount. The issue of cylinder to cylinder fuel distribution is not addressed.

U.S. Pat. No. 3,575,145 to Steiger describes a fuel injection system in which the fuel delivery to all cylinders of an engine is equalized by making adjustments in individual fuel deliveries during engine operation on the basis of continuous measurements of the deliveries in individual injection lines. This is a feedback system. It does not involve a memory storing information on the individual pump characteristic.

U.S. Pat. No. 3,587,547 to Hussey et al describes a particular high pressure common rail fuel injection system. It does not address the problem of equal cylinder to cylinder fuel distribution.

U.S. Pat. No. 3,835,819 to Anderson includes a detailed description of a fuel delivery and spark ignition control system. The main feature of the system is the use of digital electronics rather than analog circuits which were in wide use at that time. The system includes a digital data memory containing data on engine fuel requirements at various operating conditions. The memory contains no information on the individual injectors characteristics, and the question of cylinder to cylinder fuel distribution is not addressed.

U.S. Pat. No. 4,248,194 to Drutchas et al describes a control system to control flow from a pump by changing the speed of a motor driving the pump according the changing operating conditions. A digital embodiment of the invention includes a memory containing data on the pump characteristic. However, the above data are obtained statistically by testing a substantial number of pumps. No information on individual pump characteristics is provided, and the problem of equal cylinder to cylinder fuel distribution is not addressed.

U.S. Pat. No. 4,366,541 to Mouri et al describes a system controlling ignition timing and fuel flow in an engine equipped with a single central injector. The fuel flow is controlled by varying the injector valve opening duration as a function of air flow, RPM, temperature, etc., which are measured by sensors during the engine operation. The system includes a memory containing correction values to compensate for inaccuracy of measurements performed by the air flow sensor and/or other sensors. The correction values are entered into the memory at the time of motor vehicle delivery or at subsequent inspections and eliminate the need for mechanical adjustment. This patent teaches matching a fuel system to an individual engine and its sensors and does not relate to a fuel injection system which can be installed on any engine and deliver the same quantity of fuel to all cylinders. The problem of equal cylinder to cylinder fuel distribution is not addressed.

U.S. Pat. No. 4,368,705 to Stevenson et al describes an engine control system controlling injection timing and maximum allowable fuel delivery in a diesel engine. As far as the fuel control is concerned, the system controls the fuel rack limit for different engine speeds and injection timings according to information contained in the microprocessor memory. The system does not control fuel delivery. Fuel flow is controlled by the engine operator and the function of the system is to prevent the operator from increasing the fuel delivery beyond a maximum limit which may be different for different operating conditions. The above invention does not address the problem of individual pump characteristics, nor does it address the question of cylinder to cylinder fuel distribution.

U.S. Pat. No. 4,398,515 to Canup et al describes a diesel engine control system which controls fuel delivery as a function of engine speed by controlling a metering valve of a fuel injection pump in accordance with data contained in a microprocessor memory. There is nothing in the system that would assure that a given position of the metering valve stop will actually produce the required fuel delivery with required precision. The invention does not address the problem of individual pump characteristic. The question of equal cylinder to cylinder fuel distribution is not addressed either.

SUMMARY OF THE INVENTION

A fuel injection system for a multicylinder internal combustion engine includes a solenoid controlled fuel injection pump supplying fuel to each cylinder. The system includes a digital memory which stores fuel injection information relating to the particular fuel delivery characteristics of the fuel pump associated with the memory. The system is designed to compensate for inherent deviations in pump output due to manufacturing tolerances from one pump to the other. The fuel quantity is controlled by varying the width of a control pulse to a solenoid. For example, during a test run for each pump, which may include a plunger for each cylinder, the solenoid pulse width is individually adjusted for each plunger until the fuel delivery from each plunger is equal to a required theoretical value. Advantageously, the value of this correction factor is determined for each plunger at a number of test points, i.e., pump speeds and fuel delivery rates, and the correction values, in terms of pulse width timing are stored in a pump memory.

BRIEF DESCRIPTION OF THE DRAWINGS

FIGS. 1A and 1B show the cross-section of a fuel pump during fuel charging and fuel discharging;

FIG. 2 is a graphical representation versus time of A, a voltage indicating the control pulse, B, a current indicating the resulting solenoid current pulse, and C, valve travel distance indicating the resulting spill valve travel;

FIG. 5 is a block diagram of a fuel injection system in accordance with an embodiment of this invention.

DETAILED DESCRIPTION OF THE INVENTION

Figure 3:
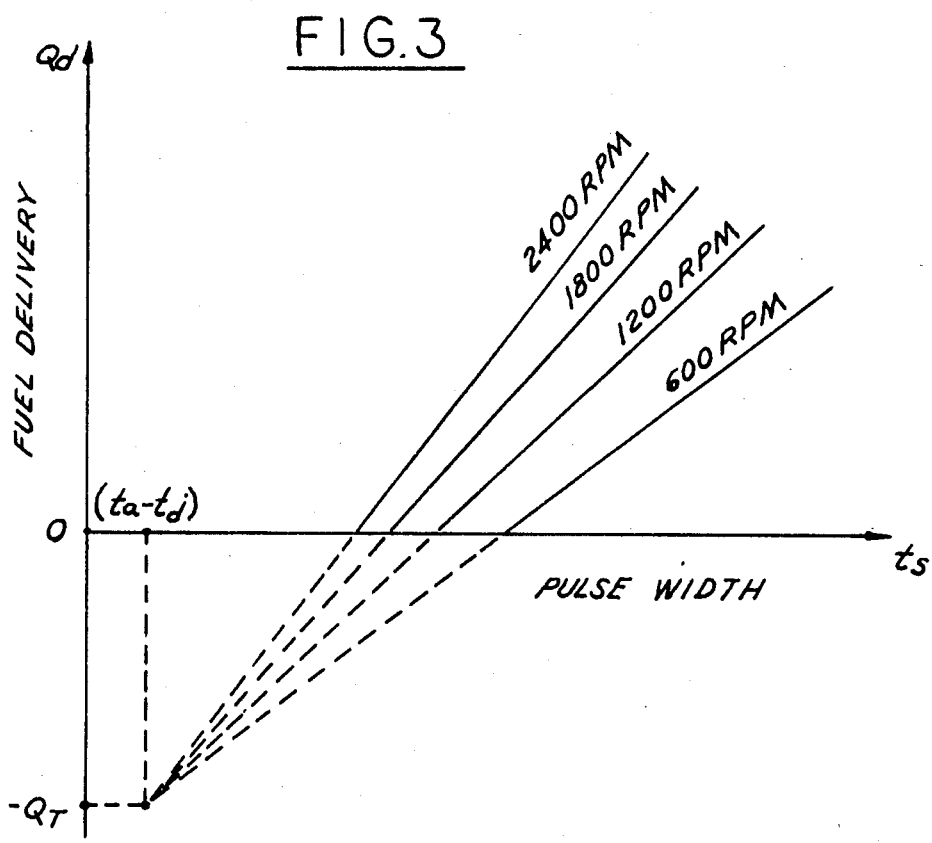
FIG. 3 is a graphical representation of fuel delivery versus applied control pulse width in accordance with an embodiment of this invention.

Referring to FIG. 5, a self adjusting fuel injection system 10 includes a fuel injection pump 11 equipped with a memory 12 containing information on the individual characteristic of pump 11 in terms of inherent deviations from a prescribed standard characteristic, and a communication link 13 to communicate this information to a control system 14 programmed to read pump memory 12 and make suitable adjustments in signals, such as a signal provided by solenoid driver 15, controlling the pump operation so that the adjusted pump characteristic coincides with the prescribed standard one. The above principle is also applicable to a set of unit injectors. In case of a conventional spill controlled pump, the adjustable element controlling the pump operation could be the control rack position. In case of a pump with electromagnetic spill control, the adjustable element can be the solenoid control pulse width.

Since control system 14 must be able to read pump memory 12 and process the acquired information with great speed, using a microprocessor is advantageous. Pumps with electromagnetic control are advantageous for application of the self adjustment principle, due to the speed with which the solenoid pulse width can be adjusted, thus adjusting the fuel quantity without the need to move any parts. For example, a self-adjusting fuel injection system can include a fuel injection pump with electromagnetic spill control and a memory containing suitable information necessary for the desirable adjustment in the individual pump characteristic, and a control system with a microprocessor capable of reading the pump memory and, on the basis of this information, implementing incremental modifications in the solenoid pulse width leading to the desirable adjustment in the pump characteristic.

Many types of fuel injection pumps employ the spill control principle for fuel quantity control. In a spill controlled pump the total displacement is in excess of the maximum fuel flow required. The spill port is closed during a certain part of the plunger stroke, and fuel displaced by the plunger is forced into an injection line leading to one of the engine cylinders. Controlling the duration of spill port closing controls the fuel quantity. In a conventional pump, a mechanical system is used to perform this function. Injection timing is controlled either by rotating a stationary cam or by advancing the camshaft relative to the crankshaft. An electromagnetic fuel injection pump employs a microprocessor controlled solenoid valve to close the spill port during the pumping stroke of the plunger. Varying the time of the solenoid activation and deactivation controls both the fuel quantity and injection timing.

The process of electromagnetic spill control can be divided into four stages, two of which are diagrammatically illustrated in FIGS. 1A and 1B. The key components of the system are a normally closed delivery valve 41 and a normally open solenoid operated spill valve 42. The solenoid, which is not shown in the diagrams, remains deenergized most of the time. A cam driven plunger 43 reciprocates in a plunger barrel 44 with a velocity determined by the pump RPM and the cam profile and provides the mechanical pumping action.

In Stage A, shown in FIG. 1A, delivery valve 41 is closed and spill valve 42 is open. Plunger 43 moves downward, and plunger barrel 44 fills with fuel entering from a fuel supply system through a supply port 45 and through an open spill/fill port 46. Sometimes an additional fill port, open when the plunger is near bottom dead center, is added to facilitate better filling.

In Stage B (not shown) delivery valve 41 is still closed, and spill valve 46 remains open. Plunger 43 moves upward and displaces the fuel from plunger barrel 44 through open spill/fill port 46 and supply port 45 back into the fuel supply system.

In Stage C, shown in FIG. 1B, plunger 43 continues its upward movement. At a certain instant the solenoid is energized and its magnetic traction causes spill valve 42 to close spill/fill port 46, thus trapping the fuel inside plunger barrel 44. The rising pressure in plunger barrel 44 opens delivery valve 41, and plunger 43 displaces the fuel through open delivery valve 41 and an injection port 47 leading to an injection line.

In Stage D (not shown) the solenoid is deenergized and the magnetic force disappears. The injection pressure opens spill valve 42 and a return spring 48 brings spill valve 42 to fully open position. The pressure in plunger barrel 44 collapses and delivery valve 41 closes. The fuel injection is terminated and plunger 43 completes the last part of its upward stroke, displacing the remaining fuel back into the supply system. After top dead center of plunger 43, the whole cycle is repeated again.

An electronic control system receives a succession of piston position reference signals and sends out a corresponding succession of control voltage pulses which activate the solenoid valves in the pump.

The reference signals come from a sensor which is usually installed on the engine crankshaft, and thus the frequency of the signals varies with engine speed. Each signal corresponds to a specific fixed reference position of a piston in one of the engine cylinders. The width of the control pulses is variable, and each pulse is separated from its reference signal by a variable time delay.

FIG. 2 shows a graph of the control pulse versus time, and corresponding graphs of the resulting solenoid current pulse and the spill valve travel. The time scale in all three graphs is the same. The controlled variables are the control pulse delay $\nabla t$ and the control pulse width $t_s$. The required end of injection timing relative to the reference signal is denoted as $t_r$.

Directly affecting the fuel delivery is the duration of the spill valve 42 closing t. It differs from the control pulse $t_s$, both in timing and duration, due to valve activation time $t_a$ and deactivation time $t_d$. The activation time $t_a$ mostly reflects the time involved in valve travel. The deactivation time $t_d$ reflects the delay in spill valve 42 opening after the termination of the control pulse, and it is due to the fact that decay of magnetic field is a gradual process.

From the graphs in FIG. 2 we see that:

$$t_s = t + t_a - t_d \tag{1}$$

$$\Delta t = t_t - t - t_a \tag{2}$$

The quantity of fuel which a single plunger can be expected to deliver to the engine cylinder during a single plunger stroke can be determined theoretically for an ideal case in which the pump geometrical, electrical, and magnetic parameters are precisely as defined in the pump specification, and the effect of internal leakage and dynamic factors can be ignored. In a general case in which the plunger velocity $v - ds/dt$, where s is stroke distance and t is time, varies during the plunger stroke as a function of cam geometry, the rate of fuel displacement q is variable too and can be expressed by the following equation:

$$q = Av/6N \tag{3}$$

where:
q = fuel displacement rate in mm³/degree of pump rotation
A = plunger face area in mm²
v = plunger velocity in mm/s
N = pump angular velocity in revolutions per minute (RPM)

The theoretical value of fuel delivery is:

$$Q_d = 6N \int_{t_1}^{t_2} q \, dt - Q_r \tag{4}$$

where:
$Q_d$ = fuel delivery in mm³
$Q_r$ = retraction volume in mm³
$t_1$ = time coordinate of spill valve closure in seconds
$t_2$ = time coordinate of spill valve opening in seconds For a given cam geometry, the term 6 Nq can be expressed mathematically as a function of time, and therefore the integral $$\int_{t_1}^{t_2} 6 Nq \, dt$$

can always be precisely computed for any values of pump velocity N and the times $t_1$ and $t_2$. It represents the theoretical value of the displaced volume of fuel in mm³. In a particular case in which the fuel displacement rate q is constant for the entire portion of the plunger stroke during which fuel injection may take place, the equation for the theoretical fuel delivery is:

$$Q_d = 6Nq \, t - Q_r \tag{5}$$

or considering equation (1):

$$Q_d = 6 Nq (t_s - t_a + t_d) - Q_r \tag{6}$$

where:
$t_s$ = solenoid voltage pulse width in seconds
$t_a$ = spill valve activation time in seconds
$t_d$ = spill valve deactivation time in seconds Therefore, the solenoid pulse width theoretically required to delivery fuel quantity $Q_d$ is $$t_s = (Q_d + Q_r)/6Nq + t_a - t_d \tag{7}$$

Graphic representation of the theoretical relationship between the fuel delivery $Q_d$ and the pulse with $t_s$ is shown in FIG. 3. It is a family of straight lines originating from a single point with coordinates $(t_a - t_d)$ and $(-Q_r)$. The slope of each line is proportional to pump speed N.

In reality, however, the actual value of the fuel delivery $Q_d$ differs from the theoretically computed one due to unavoidable deviations in pump geometry and its electrical and magnetic parameters from specified values, as well as due to internal leakage and other factors which are strongly affected by manufacturing tolerances. Since the factors affecting the actual fuel delivery may differ not only from pump to pump, but also from plunger to plunger, the same control pulse width produces different fuel deliveries from different plungers even in the same pump. Because of that, the values of air to fuel ratios in individual engine cylinders differ from the required ones, and this has a detrimental effect on engine performance and fuel economy.

To minimize the cylinder to cylinder fuel maldistribution, fuel injection pumps are usually manufactured with a very high degree of accuracy, which contributes to high costs. It is possible, however, to achieve equal fuel delivery to all cylinders if the solenoid pulse width is individually tailored for each pump plunger to compensate for the deviation from the theoretical fuel delivery, so that the fuel delivery from all plungers is equal to the required theoretical value $Q_d$. This condition is mathematically expressed as follows:

$$t_c = t_s + t_x \tag{8}$$

where:
$t_c$ = corrected value of solenoid pulse width
$t_s$ = theoretical value of solenoid pulse width
$t_x$ = correction term The correction term $t_x$ is empirically determined for each plunger and may vary with change in speed and fuel delivery. It can be positive or negative. A set of correction terms covering the entire pump operating range is stored in the pump memory.

Figure 4:
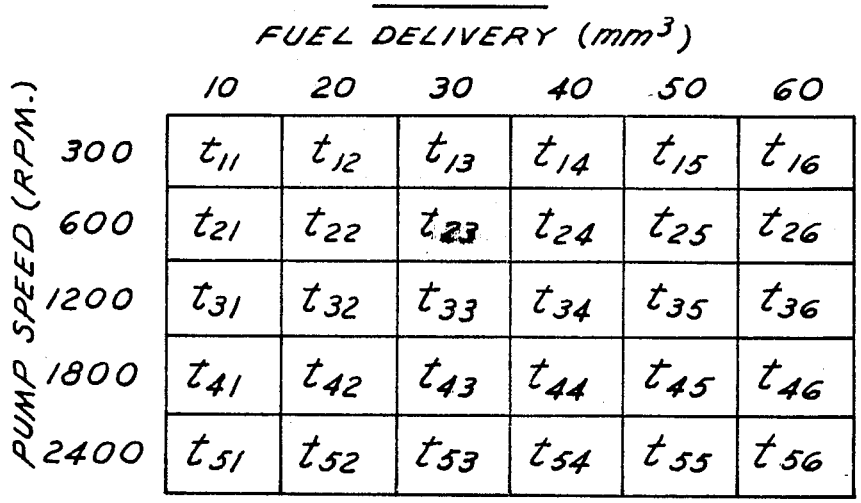
FIG. 4 is a table representing a memory with stored correction factors for a particular fuel plunger as a function of fuel delivery and pump speed.

A newly manufactured pump is subjected to a calibration procedure on a test stand, during which the pump is run at a variety of predetermined test points. At each test point, the solenoid pulse width $t_c$ is individually adjusted for each plunger until the fuel delivery from each plunger is equal to the required theoretical value. The value of the correction factor $t_x = t_c - t_s$ is determined for each plunger at each test point and permanently stored in the pump memory. An example of a table of correction terms is given in FIG. 4. A separate table exists for each plunger.

A sensor installed on or near the pump shaft provides a synchronizing signal telling the control system which plunger will be the next to inject fuel, so that the proper correction is applied to the operation of each plunger. Before each pulse width is determined, the control system reads the table applying to the plunger which is about to initiate fuel injection and determines the value of the correction term $t_x$. This can be done either by rounding up the actual pump speed and required fuel delivery to the nearest values existing in the table, or by means of interpolation. Once the value of $t_x$ has been established, the control system computes the solenoid pulse width $t_c$ using the following equation:

$$t_c=(Q_d+Q_r)/6Nq+t_a-t_d+t_x \qquad (9)$$

The resulting fuel deliveries from all plungers will be much closer approximations of the theoretical fuel delivery than would be the case without using the correction terms, and thus much better cylinder to cylinder fuel distribution will be achieved. It should be noticed that a substantially similar improvement in fuel distribution could be achieved even if the manufacturing tolerances in the pump were to be relaxed in comparison with the present practice.

After a prolonged period of usage, the pump performance usually deteriorates, mostly because of wear in the moving parts. In such a case, the pump's original characteristic can be substantially restored simply by recalibrating it and inserting new values of correction terms $t_x$ into the pump memory.

A random access memory (RAM) or read only memory (ROM) microchip can be used to store the correction terms. Such a microchip can be installed directly on the pump and connected with the microprocessor in the engine control system by means of a communication link as shown diagrammatically in FIG. 5. To avoid the need for a separate memory chip and the communication link, the correction terms can be stored directly in the microprocessor memory. With such a method the pump and the microprocessor become inseparable. In yet another alternative the pump comes with its own microchip and, when the pump is installed on the engine, the microchip is plugged into the control system where it becomes an extension of the microprocessor memory When the pump is replaced, the microchip is replaced too. The above described system is applicable to all types of electromagnetic pumps: (1) the nondistributor multiplunger-type in which each plunger is controlled by a separate solenoid and supplies fuel to one of the engine cylinders, (2) the semi-distributor multiplunger-type in which each plunger supplies fuel to one of the cylinders but one solenoid controls operation of several plungers, and (3) the distributor-type pump in which a single plunger controlled by a single solenoid successively delivers fuel to all cylinders of the engine. In the latter two cases the control system will be programmed to generate a succession of signals, all sent to the same solenoid. Each signal will be individually tailored to control fuel delivery to one of the engine cylinders.

In addition to improvement in the cylinder to cylinder fuel distribution, the self-adjusting system can also improve the cycle to cycle fuel distribution. In cases when the cycle to cycle maldistribution follows a discernible cyclical pattern, the pump memory can contain information on this pattern at specific test points, so that the control system can make suitable corrections in the solenoid pulse width following specific sequence corresponding to the known pattern of cyclical variations in fuel delivery. To make sure that the sequence of corrections is in proper synchronization with the sequence of variations, the control system receives a synchronizing signal from a sensor capable of recognizing a selected reference cycle such as peak fuel delivery cycle. Crankshaft acceleration sensor or combustion pressure sensor can be used for this purpose.

Various modifications and variations will no doubt occur to those skilled in the art to which this invention pertains. For example, the particular processing of the signals from the memory may be varied from that disclosed herein. These and all other variations which basically rely on the teachings through which is disclosure has advanced the art are properly considered with the scope of this invention.

I claim:

1. A self-adjusting fuel injection system including;
   a fuel pump;
   a memory associated with said fuel pump for storing fuel delivery data and test data associated with and characterizing said fuel pump including additional data or corrections necessary to compensate for cycle-to-cycle variations in fuel delivery;
   a control means coupled to said fuel pump for applying an actuating control pulse to said fuel pump as a function of the desired amount of fuel, said control means including a correction means coupled to said memory for varying the width of said actuating control pulse thereby correcting for the deviation of individual characteristics of a particular pump from a standard characteristic and using said additional data to make suitable corrections in the control pulse width following a specific sequence corresponding to a known pattern of cylindrical variations in fuel delivery; and
   a sensor coupled to said control system and the engine capable of recognizing a selected reference cycle and providing a synchronizing signal to said control system to assure that the sequence of corrections is a proper synchronization with the sequence of variations, said additional data being such that said sequence of corrections eliminates cycle-to-cycle variations in fuel delivery.

2. A fuel injection system for a multi-cylinder internal combustion engine including:
   a fuel injection pump including at least one control solenoid, for supplying discrete quantities of fuel to each engine cylinder during each cycle;
   an electronic control system coupled to said solenoid capable of controlling the discrete quantity of fuel injected by controlling the voltage pulse width applied to said solenoid, said control system including a first pulse width generation means, a second pulse width generation means, and an auxiliary memory;
   said auxiliary memory containing sets of numerical data, one set for each engine cylinder, each datum representing an incremental corrective value of the solenoid pulse width for a specific required fuel quantity at specific pump speed, said data entered into said memory during advance testing of the said pump and selected so that at any test point the discrete fuel quantities being supplied to each cylinder are equal to each other and equal to the required fuel quantity;
   said first pulse width generation means providing a first theoretical value of the pulse width determined on the basis of ideal operating conditions;
   said second pulse width generation means providing an incremental corrective value of the pulse width determined on the basis of data selectively read of each engine cylinder and reflecting a correction necessary to compensate for deviation from said ideal conditions, the incremental corrective value being added to or subtracted from the said first pulse width, so that the resulting pulse width is individually tailored for each engine cylinder and the discrete quantities of fuel actually supplied to all engine cylinders at a given engine operating condition are equal to each other and equal to the required fuel quantity;

said auxiliary memory containing additional data on corrections necessary to compensate for cycle-to-cycle variations in fuel delivery, and said control system using said additional data to make suitable corrections in the solenoid pulse width following a specific sequence corresponding to a known pattern of cyclical variations in fuel delivery; and a sensor coupled to said control system and the engine capable of recognizing a selected reference cycle and providing a synchronizing signal to said control system to assure that the sequence of corrections is a proper synchronization with the sequence of variations, said additional data being such that said sequence of corrections eliminates cycle-to-cycle variations in fuel delivery.

3. A system as recited in claim 1 or 2 in which said fuel pump includes an adjustable pump element controlling the pump operation and said adjustable pump element is the position of a physical component of the pump.

4. A system as recited in claim 1 or 2 wherein pump action of said fuel pump is controlled by a control rack.

5. A system as recited in claim I in which pump action of said fuel pump is controlled by the width of an electric pulse.

6. A system as recited in claim 5 in which the information on deviations from a prescribed standard characteristic is a set of numbers stored in said memory means in a specific manner so that the location of each number in said memory means determines the specific speed and fuel delivery combination to which the number relates, and the magnitude and sign of the number determines the magnitude and direction of required corrective action.

7. A system as recited in claim 6 in which the numbers represent incremental values of electric pulse width which are added to or subtracted from the theoretically computed pulse width.

8. A system as recited in claim 1 in which said memory means is a microchip in communication with said pump control system, and said pump control system includes a microprocessor for processing the information in said memory means.

9. A system as recited in claim 1 in which the said memory means is a microchip which is plugged into said pump control system and becomes an extension of said pump control system.

10. A system as recited in claim 1 in which the said memory means is part of a microprocessor memory in said pump control means.

* * * * *